United States Patent Office 2,802,784
Patented Aug. 13, 1957

2,802,784

WATER FLOODING OF SUBTERRANEAN FORMATIONS

Theodore J. Nowak, Fullerton, and Howard F. Keller, Jr., Pasadena, Calif., assignors to Union Oil Company of California, Los Angeles, Calif., a corporation of California No Drawing. Application August 30, 1954, Serial No. 453,134

11 Claims. (Cl. 252—8.55)

This invention relates to the recovery of petroleum from subterranean formations, and in particular concerns an improved water flooding process.

The technique of water flooding to recover oil from depleted oil fields is well known. In general, such process consists in introducing an aqueous medium into one or more injection wells which penetrate a depleted oil-producing formation, and forcing said medium through the formation towards a production well which likewise penetrates the formation. In the so-called "five-spot drive," the aqueous medium is forced down four injection wells which are more or less symmetrically located around a producing well. As the flooding medium passes through the formation it strips or flushes the residual oil therefrom and carries it into the producing well from which it is recovered by conventional means. The flooding medium usually comprises water or oil field brine to which has been added various conditioning materials, e. g., surface active agents or detergents which promote the desorption of the residual oil from the formation, sequestering agents which prevent the deposition of calcium and/or magnesium compounds in the interstices of the formation, bactericides which prevent the formation from becoming plugged by bacterial growth, corrosion inhibitors which prevent corrosion of the metallic well equipment and the conseqeunt deposition of corrosion products in the formation, etc. Thus, while the process is usually termed "water flooding" the flooding medium in fact constitutes a rather complex composition containing a variety of conditioning agents. It is not uncommon to include as many as 4 to 5 different agents of various types in the flooding medium. The use of a plurality of agents, however, adds substantially to the cost of the process and in many instances it is found that such agents interfere with one another.

It is accordingly an object of the present invention to provide a water flooding process in which an improved flooding medium is employed.

Another object is to provide a water flooding process in which there is employed an aqueous flooding medium containing a minimum of conditioning agents.

A further object is to provide a water flooding process employing an aqueous flooding medium comprising an agent which is both surface active and bactericidal and which does not precipitate alkaline-earth metal salts.

Other and related objects will be apparent from the following detailed description of the invention, and various advantages not specifically referred to herein will occur to those skilled in the art.

We have now found that the above objects and attendant advantages may be realized in a flooding process in which the flooding medium comprises an aqueous solution of certain surface active agents which are amphoteric in nature, i. e., which ionize in such manner that both anionic and cationic functional groups are an integral part of the molecule. In addition to their surface active properties, these agents have strong bactericidal action and do not precipitate alkaline-earth metal salts. Also, presumably by reason of their amphoteric nature, these agents display a minimum tendency to become adsorbed on solid surfaces. Consequently, when employed in aqueous flooding media a minimum amount thereof is lost from the solution by adsorption on the matrix of the formation. The invention, then, consists in a water flooding process in which the flooding medium essentially comprises an aqueous solution of an amphoteric surface active agent of the class hereinafter defined.

The surface active agents which are employed in accordance with the invention are the acid salts of aminoacids having the general formula:

wherein R represents an alkyl group containing from about 10 to about 22 carbon atoms, $x$ represents a numerical value from 0 to 4 inclusive, and R' represents a divalent aliphatic radical containing from 1 to 3 carbon atoms. The alkyl group R may be decyl, dodecyl, pentadecyl, cetyl, oleyl, heptadecyl, octadecyl, eicosyl, etc., and R' may be methylene, methylmethylene, ethylene, propylene, isopropylene, butylene, isobutylene, etc. As will be apparent, the simplest compound within this class is an acid salt, e. g., the hydrochloride, of N - decylglycine,

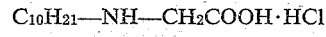

Compounds of this type, i. e., of the type wherein $x$ in the above general formula is 0, are readily prepared by reacting a long chain amine, e. g., decylamine, dodecylamine, heptadecylamine, cetylamine, etc., with a haloaliphatic acid such as chloroacetic acid, bromopropionic acid, chlorobutyric acid, etc. to form the corresponding N-alkyl-amino aliphatic acid hydrohalide. The more complex members of the class, i. e., those in which the value of $x$ is from 1 to 4, are formed by reacting a 10–22 carbon atom alkylamine with ethylenediamine or a polyethylene polyamine such as diethylenetriamine, triethylenetetramine or tetraethylenepentamine to eliminate one mole of ammonia and form an alkyl ethylene amine or polyethylene polyamine, and thereafer reacting the latter product with a haloaliphatic acid. Thus, octadecylamine may be reacted with tetraethylenepentamine to form ammonia and N-octadecyl-tetraethylenepentamine, and the latter then reacted with chloroacetic acid to form N - octadecyl - amino - tetraethylenetetraamino-acetic acid hydrochloride,

which corresponds to the above general formula where R=octadecyl, $x=4$, and R'=methylene. Alternatively, the intermediate alkyl ethylene amine or polyethylene polyamine may be formed by reaction between a suitable long chain alkylamine and ethylene imine. As further examples of the bactericidal surface active agents which are employed in accordance with the invention and defined by the above general formula, there may be mentioned the hydrohalide and other acid salts of N-dodecylglycine, N - pentadecyl - alanine, N - oleyl - amino - isobutyric acid, N - cetyl - amino - propionic acid, N - decyl - amino -isobutyric acid, N - octadecyl - aminoacetic acid, N - docosyl - amino - propionic acid, N-dodecyl - amino - ethyleneamino - acetic acid, N - decyl-amino - triethylenetriamino - butyric acid, N - cetyl-amino - tetraethylenetetramino - propionic acid, N - octadecyl - amino - diethylenediamino - isobutyric acid, N - eicosyl - amino - ethyleneamino - propionic acid, etc. All of such compounds display the desired amphoteric properites in that in aqueous solution they ionize at the acid group to form anions and at the amino group or groups to form cations. They are preferably employed in the form of their hydrochloride or other hydrohalide or sulfate salts, but other acid salts such as the acetates are operable. By reason of their stronger surface active and bactericidal properties, the acid salts of the type containing one or more ethyleneamino groups, i. e., salts in which the value of x in the general formula is from 1 to 4, are preferred and of such compounds the hydrochloride of N - dodecyl - amino - diethylenediamino - acetic acid,

is especially preferred by reason of its particularly good surface active and bactericidal properties and its commercial availability under the trade name "Tego." The following example will illustrate a typical preparation of one of the bactericidal surface active agents of the present class, but is not to be construed as limiting the invention:

Example

Approximately 185 parts by weight (1 mole) of dodecylamine are added gradually with stirring to about 172 parts (4 moles) of ethylene imine. The reaction temperature is maintained at about 5° C. by submerging the reaction vessel in an ice bath. Upon completion of the reaction, about 108 parts (1 mole) of alpha-chloropropionic acid is added directly to the reaction mixture at room temperature, whereupon reaction occurs to form N - dodecylamino - tetraethylene - tetramino - methyl-acetic acid hydrochloride,

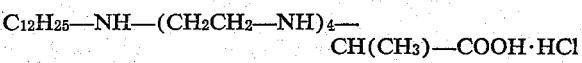

The crude reaction product is preferably used directly in accordance with the invention, but if desired it may be purified by crystallization from a suitable organic solvent.

In carrying out the present process, the flooding operation is carried out in the conventional manner except that the flooding medium consists essentially of an aqueous solution of one or a mixture of the above-described amphoteric surface active agents. The concentration of the latter in the flooding medium is usually not greater than 500 parts per million and in many cases may be as low as 10 parts per million, depending upon the nature of the formation being flooded and the degree of bacteria control required. In a typical five-spot flooding operation, oil field brine containing 50 parts per million of N-dodecyl - amino - diethylenediamino - acetic acid hydrochloride is introduced at a rate of 450 bbls. per day into each of the four input wells under a pressure sufficient to drive said solution through the formation to the centrally located output well. The fact that the operation can be continued over long periods of time without requiring any substantial increase in the pressure required to force the flooding medium through the formation indicates that no substantial plugging occurs either by reason of precipitation of alkaline-earth metal salts or bacterial growth.

While the flooding media employed in accordance with the present invention essentially comprise only water or oil field brine and one or more of the herein defined amphoteric surface active agents, they may also comprise corrision inhibitors, tracers, supplemental bactericides, and the like. Similarly, they may be employed in conjunction with any of the operating techniques commonly applied to water flooding processes and in conjunction with other secondary recovery methods.

Other modes of applying the principle of our invention may be employed instead of those explained, change being made as regards the methods or materials employed provided the step or steps stated by any of the following claims, or the equivalent of such stated step or steps, be employed.

We, therefore, particularly point out and distinctly claim as our invention:

1. In a process wherein an aqueous flooding medium is injected into a subterranean oil-bearing formation and is forced therethrough towards an output well, the improvement which consists in employing a flooding medium consisting essentially of an aqueous solution of an acid salt of a compound having th general formula:

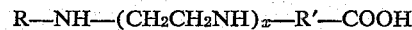

wherein R represents an alkyl group containing from about 10 to about 22 carbon atoms, x represents a numerical value from 0 to 4, and R' represents a divalent aliphatic radical containing from 1 to 3 carbon atoms.

2. The process of claim 1 wherein the concentration of the said acid salt in said aqueous solution is between about 10 and about 500 parts per million.

3. The process of claim 1 wherein the said acid salt is a hydrohalide.

4. The process of claim 1 wherein x has a value from 1 to 4.

5. The process of claim 1 wherein the said acid salt is N - dodecyl - amino - diethylenediamino - acetic acid hydrochloride having the structural formula

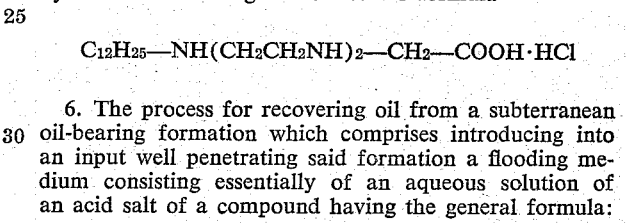

6. The process for recovering oil from a subterranean oil-bearing formation which comprises introducing into an input well penetrating said formation a flooding medium consisting essentially of an aqueous solution of an acid salt of a compound having the general formula:

wherein R represents an alkyl group containing from about 10 to about 22 carbon atoms, x represents a numerical value from 0 to 4, and R' represents a divalent aliphatic radical containing from 1 to 3 carbon atoms; forcing said medium through said formation towards at least one output well penetrating said formation at a distance from said input well; and producing oleiferous well fluids from said output well.

7. The process of claim 6 wherein the concentration of said acid salt in said aqueous solution is between about 10 and about 500 parts per million.

8. The process of claim 6 wherein the said acid salt is a hydrohalide.

9. The process of claim 6 wherein x has a value from 1 to 4.

10. The process of claim 6 wherein the said acid salt is N - dodecyl - amino - diethylenediamino - acetic acid hydrochloride having the structural formula

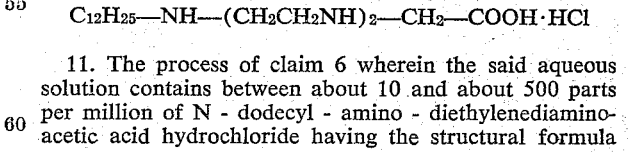

11. The process of claim 6 wherein the said aqueous solution contains between about 10 and about 500 parts per million of N - dodecyl - amino - diethylenediamino-acetic acid hydrochloride having the structural formula

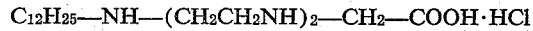

References Cited in the file of this patent

UNITED STATES PATENTS

| | | |
|---|---|---|
| 2,226,119 | DeGroote et al. | Dec. 24, 1940 |

FOREIGN PATENTS

| | | |
|---|---|---|
| 856,042 | Germany | Nov. 17, 1952 |
| 692,022 | Great Britain | May 27, 1953 |

OTHER REFERENCES

Latter: Corrosion Control, article in World Oil, January 1951, pp. 141, 142 and 144.